Aug. 30, 1955     J. A. RUDHART     2,716,285

ADJUSTABLE INDICATOR HOLDER

Original Filed Oct. 30, 1946

INVENTOR.
JOSEPH A. RUDHART
BY
HIS ATTORNEYS.

United States Patent Office 2,716,285
Patented Aug. 30, 1955

2,716,285

ADJUSTABLE INDICATOR HOLDER

Joseph A. Rudhart, Philadelphia, Pa.

Original application October 30, 1946, Serial No. 706,547, now Patent No. 2,625,746, dated January 20, 1953. Divided and this application December 17, 1952, Serial No. 326,393

3 Claims. (Cl. 33—172)

The invention relates to an adjustable holder for an indicator employed particularly as a center finding device in the location of work on a drill press, milling machine, lathe or the like. This application is a division of the copending application of Joseph A. Rudhart, Serial Number 706,547, filed October 30, 1946, and entitled "Adjustable Indicator Holder," which became Patent No. 2,625,746, issued January 20, 1935.

The principal object of the invention is the provision of a mounting for holding an indicator in a tool receiving chuck, the mounting being adjustable laterally for obtaining accurate positioning of the indicator, with respect to internal or external indications, in the alignment of the work to be operated upon.

Another object of the invention is the provision of a holder having a micrometer adjustment so that the indicator may be accurately positioned in the alignment of the work with respect to the dead center line of the machine on which the work is secured.

Another object is the provision of a holder for an indicator such as involved herein, which holder is characterized by simplicity of construction, accuracy of adjustment, ease of manipulation, etc., whereby considerable saving is effected in the manufacturing cost of the holder and also in the set-up time for locating the work.

Other objects relating to features of construction, combination of elements and arrangement of parts are either obvious or will manifest themselves as the description proceeds.

For a full and more complete understanding of the invention, reference may be had to the following description and accompanying drawing, wherein.

Figure 1:
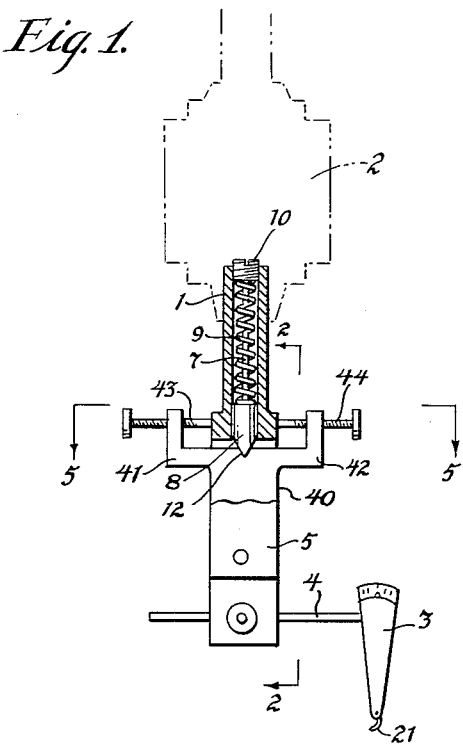
Figure 1 is a front view, partly in elevation and partly in vertical section, of the adjustable indicator holder of this invention, illustrating the holder as vertically arranged in a tool receiving chuck and substantially in working position.
Figure 2:
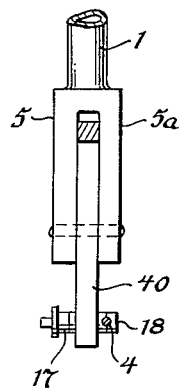
Figure 2 is an elevation of the holder, in vertical position, taken on line 2—2 of Figure 1.

Referring particularly to Figures 1 and 2 of the accompanying drawing, it will be noted that my invention comprises essentially a shank 1 having one end fitted into a tool receiving chuck 2, as for example that of a drill press, and the other end supporting an adjustable mechanism for positioning an indicator, said mechanism including a lever assembly designed to support adjustably the indicator for work aligning purposes. More specifically, the lever assembly comprises an indicator 3 suspended by an attaching rod 4 from a lever 40 arranged substantially normal thereto. The lever 40 is pivotally mounted between the arms 5 and 5a which are defined by the slotted construction of the lower end of the shank 1. The arms 5 and 5a form a knuckle joint with the lever 40, the latter being pivoted between the arms 5 and 5a with the pivoting point forming an upper lever arm 22 and a lower lever arm 23.

The upper end of the shank 1 is hollow, and mounted therein is a plunger 7 having a blade 8 formed on its lower extremity and surrounded by a coil spring 9, the ends of which abut against the top of the blade 8, and a screw threaded plug 10 fitted into the internally threaded top portion of the shank. It will be noted that the stem of the plunger does not extend the full length of the hollow portion of the shank, and that to facilitate alignment of the spring 9, the plug 10 has a depending stem which extends toward the stem of the plunger 7 but does not meet it. This arrangement provides a resilient connection between the shank 1 and the lever 40, as will be more fully described presently.

The upper lever arm 22 of the lever 40 is provided with a transverse notch 12 into which the edge of the blade 8 projects. The notch 12 thus provides a seat for the blade 8, and its sides are arranged slightly diagonal or at an angle to the lateral faces of the lever 40. By having the notch 12 cut at an angle to the lateral faces of the lever 40, which angle may be, for example, approximately ten degrees, the bearing surfaces of the notch 12 offer less resistance to the downward force of the plunger 7, thereby facilitating the restoration of the lever 40 to the vertical after it has been deflected off-center while making an adjustment. Thus, as the lever 40 is pivotally rotated so as to move the upper lever arm 22 off-center, the blade 8 is disengaged from the notch 12, and as the spring 9 exerts a continual downward force on the plunger 7, the blade 8 is automatically seated in the notch 12 on restoration of the lever 40 to a true vertical position, holding it firmly in place. The compressive force of the spring 9 on the plunger 7 may be regulated by rotational adjustment of the threaded plug 10 in the shank, which plug engages the upper end of the spring 9.

Figure 4:
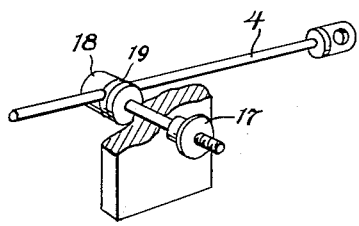
Figure 4 is a perspective view, partly in section, showing the details of the mounting of an extension bar in substantially a horizontal position.
Figure 5:
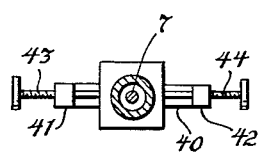
Figure 5 is a horizontal section on line 5—5 of Figure 1.

By reference to Figures 1 and 4, it will be noted that the effective length of the extension rod 4 may be adjusted by a clamping device comprising a knurled nut 17 adapted to engage the end of a stud 18 extending through an aperture provided in the lower lever arm 23 of the lever 40. Through the provision of washers 19 (see Figure 4) carried on the shank of the stud 18, a lateral adjustment of the indicator 3 with respect to the center line of the tool receiving chuck may be obtained. Likewise, by loosening the nut 17, a lateral adjustment of the rod 4 normal to that provided by the washers 19 may be obtained with respect to the center line. The adjustments just described may be easily and quickly made as a preliminary to trying the work, which adjustments having been coarsely made may be subsequently refined by manipulation of the screws 43 and 44, as hereinafter explained.

Figure 3:
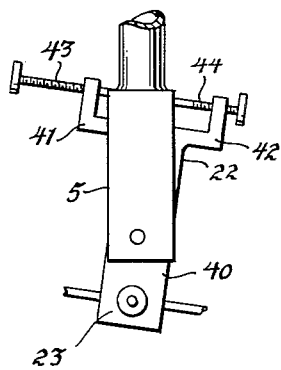
Figure 3 is a perspective view showing the indicator holder in an adjusted position and substantially vertical.

In Figures 1, 2 and 3, the arms 5 have pivoted therebetween the lever 40. It will be noted that the top of the lever 40 terminates in a yoke having fingers 41 and 42 which carry at their extremities adjusting screws 43 and 44, respectively. Figure 1 shows the holder in normal position; i. e., with the lever 40 on the vertical, and the axis thereof coinciding with the center line of the chuck. By turning either of the adjusting screws, 43 or 44, the lever 40 may be tilted off the vertical; as for example, in Figure 3, the lever 40 is shown with the top arm thereof extending to the right of center. This adjustment will move the feeler 21 of the indicator 3 inwardly or toward the work. If an adjustment is desired in the opposite direction, the screw 44 will be loosened and the screw 43 correspondingly tightened until the proper adjustment is obtained, and then both of said screws are tightened in position.

From the foregoing description, it will be seen that the adjustable holder contemplated by my invention will give extremely accurate adjustments in aligning the work with respect to the center line of the machine. This is accomplished primarily by making the indicator adjustable transversely of the center line, and also adjustable laterally thereof, said adjustments being of a preliminary nature and involving a bodily movement of the indicator. By supplementing these coarse or preliminary adjustments with a precision construction, which does not contemplate a bodily movement of the indicator per se with respect to dead center, a micrometer adjustment may be obtained for locating the work.

It will be noted that my holder for mounting the indicator does not involve any spring tension exerted directly on the shank of the mounting construction, which arrangement might introduce accuracies inherent in some prior art devices. It is also obvious that due to the simplicity of my construction and ease of making the various adjustments provided for, a considerable saving in time will be effected.

While a certain preferred embodiment of the invention is hereinbefore set forth, it is to be clearly understood that the invention is not to be limited to the exact construction illustrated and described because various modifications of the details may be provided in putting the invention into practice within the purview of the appended claims.

What is claimed is:

1. In an adjustable indicator holder, the combination of a tool receiving chuck, a mounting construction adapted to be secured to said chuck comprising a hollow shank, a pair of spaced arms carried by said shank, a lever pivotally mounted between said arms and formed with a yoke providing fingers on opposite sides of said shank in spaced relation thereto, an adjusting screw threadably mounted in each finger and having a free end normally engaging said shank, an adjustable resilient connection between said shank and said lever including a spring, a plunger actuated by said spring and mounted within said shank, and a threaded plug in said shank adjustably engaging said spring, a seat for said plunger formed upon the adjacent end of said lever, and an attaching rod on said lever arm for supporting an indicator.

2. In an adjustable indicator holder, the combination of a tool receiving chuck, a mounting construction adapted to be secured to said chuck comprising a hollow shank, a pair of spaced arms carried by said shank, a lever pivotally mounted between said arms and having one end located between said arms and the other end disposed beyond said arms, a U-shaped yoke on the end of the lever between said arms presenting fingers on opposite sides of said shank in spaced relation thereto, an adjusting screw threadably mounted in each finger and having a free end normally engaging said shank, an adjustable resilient connection between said shank and said lever including a coil spring, a plunger actuated by said spring and mounted within said shank, and a threaded plug in said shank adjustably engaging said spring, a notched seat for said plunger formed upon the adjacent ends of said lever, and an attaching rod on the end of the lever beyond said arms for supporting an indicator.

3. In an adjustable indicator holder, the combination of a tool receiving chuck, a mounting construction adapted to be secured to said chuck comprising a hollow shank, a pair of spaced arms integrally connected to said shank and depending downwardly therefrom, a lever pivotally mounted between said arms and having one end located between said arms and the other end disposed below said arms, a U-shaped yoke on the end of the lever between said arms presenting vertical fingers on opposite sides of said shank in spaced relation thereto, an adjusting screw threadably mounted in each finger and having a free end normally engaging said shank, the end of the lever between said arms being provided with a transverse notch, a plunger slidably mounted in said shank having a blade end which engages said notch to hold the lever vertical, a coil spring housed within said shank with one end thereof pressing against said plunger, a threaded plug carried by the shank in adjustable engagement with said spring to vary the compression thereof, and an adjustable attaching rod on the end of the lever below said arms for supporting an indicator.

References Cited in the file of this patent

UNITED STATES PATENTS

| | | |
|---|---|---|
| 913,993 | Turnbull | Mar. 2, 1909 |
| 1,206,668 | Caron | Nov. 28, 1916 |
| 1,867,387 | Smith | July 12, 1932 |
| 2,458,753 | Wallace | Jan. 11, 1949 |
| 2,625,746 | Rudhart | Jan. 20, 1953 |

FOREIGN PATENTS

| | | |
|---|---|---|
| 93,037 | Switzerland | Feb. 16, 1922 |